(12) United States Patent
Liu et al.

(10) Patent No.: US 11,321,165 B2
(45) Date of Patent: May 3, 2022

(54) DATA SELECTION AND SAMPLING SYSTEM FOR LOG PARSING AND ANOMALY DETECTION IN CLOUD MICROSERVICES

(71) Applicant: INTERNATIONAL BUSINESS MACHINES CORPORATION, Armonk, NY (US)

(72) Inventors: Xiaotong Liu, San Jose, CA (US); Jiayun Zhao, San Jose, CA (US); Anbang Xu, San Jose, CA (US); Rama Kalyani T. Akkiraju, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/028,860

(22) Filed: Sep. 22, 2020

(65) Prior Publication Data

US 2022/0091916 A1 Mar. 24, 2022

(51) Int. Cl.
*G06F 11/00* (2006.01)
*G06F 11/07* (2006.01)
*G06N 20/00* (2019.01)

(52) U.S. Cl.
CPC ........ *G06F 11/079* (2013.01); *G06F 11/0709* (2013.01); *G06F 11/0751* (2013.01); *G06F 11/0778* (2013.01); *G06N 20/00* (2019.01)

(58) Field of Classification Search
CPC ............... G06F 11/079; G06F 11/0709; G06F 11/0751; G06F 11/0778; G06F 11/0781; G06F 11/3072
See application file for complete search history.

(56) References Cited

U.S. PATENT DOCUMENTS

| | | | |
|---|---|---|---|
| 7,747,587 B2 | 6/2010 | Kubota et al. | |
| 7,895,167 B2 | 2/2011 | Berg et al. | |
| 8,234,256 B2 | 7/2012 | DeStefano et al. | |
| 8,452,761 B2 | 5/2013 | Sabato et al. | |
| 8,495,429 B2 | 7/2013 | Fu et al. | |
| 8,620,928 B1 | 12/2013 | Walton et al. | |

(Continued)

FOREIGN PATENT DOCUMENTS

| | | |
|---|---|---|
| CN | 104144081 A | 11/2014 |
| WO | 2019060327 A1 | 3/2019 |

OTHER PUBLICATIONS

Zhu, et al., "Tools and Benchmarks for automated Log Parsing," Proceedings of the 41st International Conference on Software Engineering: Software Engineering in Practice, May 2019, pp. 121-130.

(Continued)

*Primary Examiner* — Philip Guyton
(74) *Attorney, Agent, or Firm* — Conley Rose, P.C.

(57) ABSTRACT

A method for log data sampling is disclosed. The method includes receiving logs of a computer system. A log comprises information regarding an operation of the computer system. The method also includes determining a sample of the logs by applying a set of sampling methods to the logs. The method further includes providing the sample of the logs as an input to an anomaly detection model for the computer system. The anomaly detection model identifies a fault in the operation of the computer system based on the input.

17 Claims, 7 Drawing Sheets

(56) References Cited

U.S. PATENT DOCUMENTS

| | | | |
|---|---|---|---|
| 8,850,263 B1 | 9/2014 | Yourtree et al. | |
| 9,244,755 B2 | 1/2016 | Huang et al. | |
| 10,116,675 B2 | 10/2018 | Brown et al. | |
| 10,122,575 B2 | 11/2018 | Petersen et al. | |
| 10,599,668 B2 | 3/2020 | McLean | |
| 2015/0019512 A1* | 1/2015 | Basak | G06F 16/1748 707/692 |
| 2016/0026510 A1* | 1/2016 | Furtwangler | G06F 11/3452 719/318 |
| 2019/0243827 A1 | 8/2019 | Ferrar | |

OTHER PUBLICATIONS

He, et al., "Drain: An online log parsing approach with fixed depth tree," 2017 IEEE International Conference on Web Services (ICWS), Jun. 2017, pp. 33-40.

\* cited by examiner

DATA SELECTION AND SAMPLING SYSTEM FOR LOG PARSING AND ANOMALY DETECTION IN CLOUD MICROSERVICES

BACKGROUND

The present disclosure relates generally to the field of data selection and, more particularly, to log data sampling.

Logs are textual messages generated by network devices, applications, operating systems, and programmable or smart devices. Logs contain information about system behaviors that lead to system faults and problems. Because logs are in an unstructured format, the logs are parsed, meaning converting unstructured textual log messages into a structured format, before a meaningful analysis can be performed. An example of log analysis is log anomaly detection. The log anomaly detection involves detecting anomalous system behaviors and finding signals that can provide clues to the reasons and the anatomy of a system's failure.

SUMMARY

A method for log data sampling is disclosed. The method includes receiving logs of a computer system. A log comprises information regarding an operation of the computer system. The method also includes determining a sample of the logs by applying a set of sampling methods to the logs. The method further includes providing the sample of the logs as an input to an anomaly detection model for the computer system. The anomaly detection model identifies a fault in the operation of the computer system based on the input.

A system for log data sampling is also disclosed. The system includes a memory having instructions therein and at least one processor in communication with the memory. The at least one processor is configured to receive logs of a computer system. A log comprises information regarding an operation of the computer system. The computer system supports microservices. The at least one processor is also configured to determine a sample of the logs by applying a set of sampling methods to the logs. The at least one processor is also configured to provide the sample of the logs as an input to an anomaly detection model for the computer system. The anomaly detection model identifies a fault in the operation of the computer system based on the input.

A computer program product for log data sampling is also disclosed. The computer program product includes a computer readable storage medium having program instructions embodied therewith. The program instructions are executable by at least one processor to cause the at least one processor to receive logs of a computer system. A log comprises information regarding an operation of the computer system. The program instructions are also executable by the at least one processor to cause the at least one processor to determine a sample of the logs by applying a set of sampling methods to the logs. The program instructions are also executable by the at least one processor to cause the at least one processor to provide the sample of the logs as an input to an anomaly detection model for the computer system. The anomaly detection model identifies a fault in the operation of the computer system based on the input.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
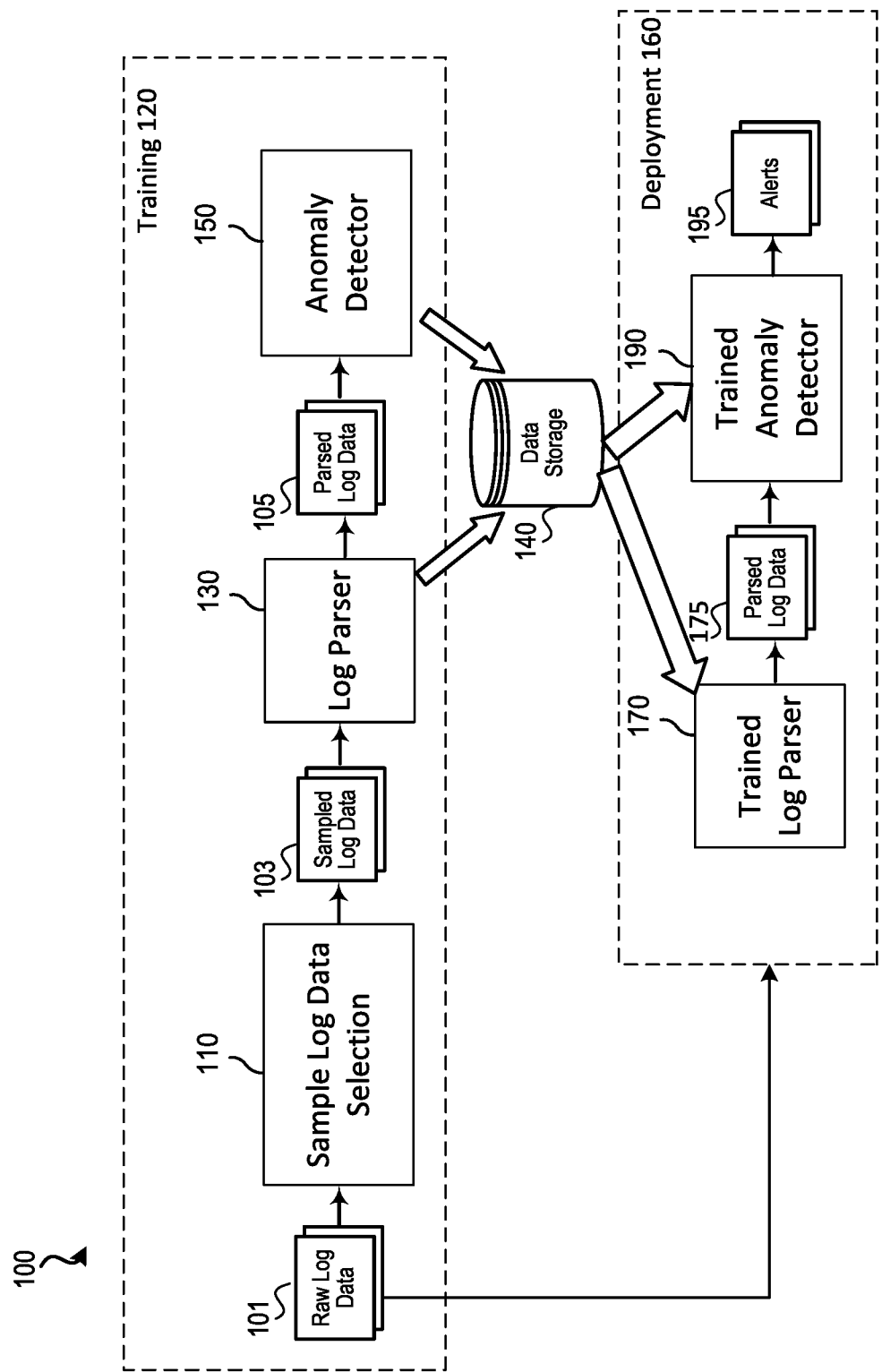
FIG. 1 is a block diagram illustration of an anomaly detection environment in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Microservice system employs a software application that is developed as a suite of small services (i.e., microservices) and implemented on a cloud server. Each microservice independently runs its own process. Execution of such microservice system may involve a large number of microservice interactions. Most of these interactions are asynchronous and involve complex invocation chains. As a result, the number of logs produced from multiple microservices grows rapidly. For example, a size of the logs can amount to approximately 50 gigabytes per hour, which means the microservices can generate at least 120 to 200 million lines of logs per hour. Moreover, these massive logs are produced by distributed microservices separately and then uploaded to a centralized location for further analysis, which can result in missing, duplicated, or disordered logs. Furthermore, noise may be introduced into the original log data during collection, retrieval, and pre-processing of log data in such a cloud environment.

Conventionally, log parsing and anomaly detector machine learning models are trained on such massive, disorganized, and chaotic logs. In addition, each microservice requires separate log parsing and anomaly detector machine learning models because logs of different microservices may have unique information. As such, the conventional way of training the log parsing and anomaly detector machine learning models inevitably results in excessive processing resources and time.

Accordingly, the present disclosure provides a technical solution for not only reducing the number of logs used in the training, but also provides a sample of logs that are diverse, representative and unbiased across many microservices. The technical solution includes modules that determine a sample of logs using multiple sampling methods and adjust the sampling methods based on feedback from a multi-faceted sample data analyses. The solution not only saves the processing resources and time required to train and maintain log parsing and log anomaly detector machine learning models with a relatively smaller data size, but also improves the quality of these models with high-quality training samples. Moreover, such modularized sample log data selection can be easily accommodated and customized to various log parsing and log anomaly detector machine learning models for different microservices.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" (and inflections thereof) as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

FIG. 1 is a block diagram illustration of an anomaly detection environment 100 in accordance with aspects of the present disclosure. The anomaly detection environment 100 includes two distinct environments—a training environment 120 and a deployment environment 160.

The training environment 120 is for training log parser and anomaly detector models 130 and 150. The training environment 120 includes a sample log data selection module 110 and two machine learning models under training—log parser 130, and anomaly detector 150. The sample log data selection module 110 receives a collection of raw logs 101 as an input and outputs an optimal sample of logs 103 resulting from continuous improvement of sampling methods based on feedback from sample analyses. The log parser 130 corresponds to a machine learning model that is being trained on sampled logs to generate templates for parsing the logs and parsing logs using the templates. The anomaly detector 150 corresponds to another machine learning model that is being trained on the parsed logs to detect anomal behaviors or patterns in an operation of a computer system (e.g., a cloud server providing microservices). In some embodiments, the log parser 130 and the anomaly detector 150 can be trained under supervised learning. Once the log parser 130 and the anomaly detector 150 are trained, they can be stored on a data storage 140.

The deployment environment 160 is for generating alerts 195 that notify faults or errors in the computer system that generated logs. The deployment environment 160 includes a trained log parser 170 for producing parsed logs 175 based on templates and a trained anomaly detector 190 that generates the alerts 195 based on information from the parsed logs 175. The trained log parser 170 and the trained anomaly detector 190 can be retrieved from the data storage 140.

Figure 2:
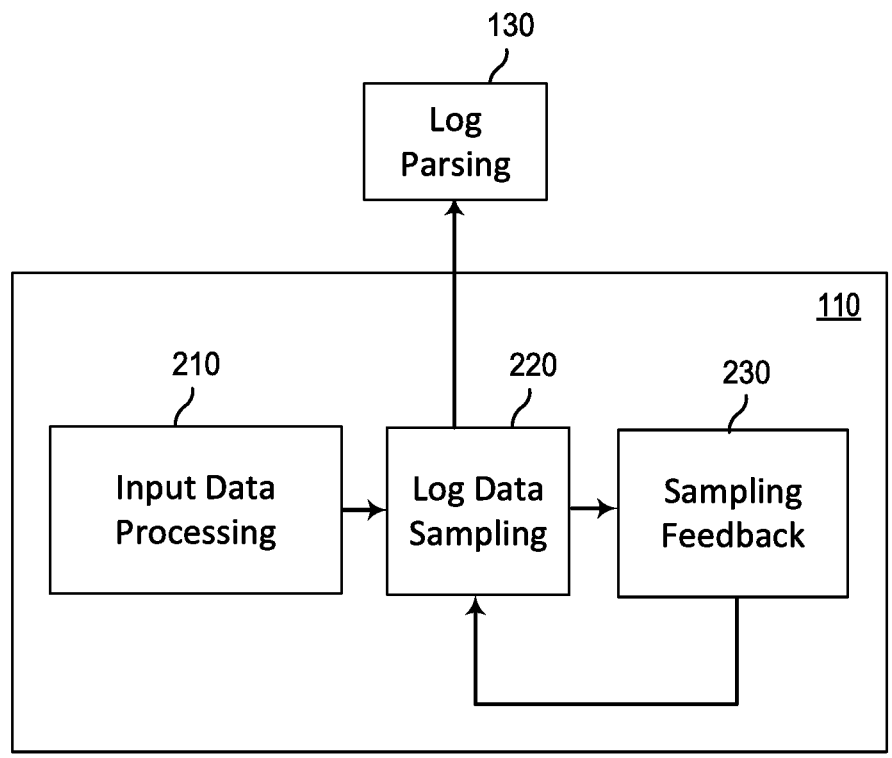
FIG. 2 is a block diagram illustration of the sample log data selection module in accordance with aspects of the present disclosure.

FIG. 2 is a block diagram illustration of the sample log data selection module 110 in accordance with aspects of the present disclosure. The sample log data selection module 110 includes the input data processing module 210, the log data sampling module 220, and the sampling feedback module 230 for selecting a diverse, representative and unbiased sample of logs in order to train a machine learning model (e.g., log parsing and anomaly detector machine learning models). In some embodiments, the sample log data selection module 110 may only include the log data sampling module 220 and the sampling feedback module 230.

The input data processing module 210 can receive raw logs from a computer system (such as, a cloud server or a component of the cloud server that supports the microservices). The input data processing module 210 can also convert formats of the raw logs into a single uniform format for sampling. Further details of the input data processing module 210 will be described with respect to FIG. 3.

The log data sampling module 220 can determine a sample of logs based on the logs received from the input data processing module 210 by using a set of sampling methods. The log data sampling module 220 can provide the sample to the log parser 130. More details of the log data sampling module 220 will follow in the description of FIG. 4.

Moreover, the sampling feedback module 230 can provide feedback to the log data sampling module 220 based on multi-faceted analyses of sampled logs and the log data sampling module 220 can update sampling methods to generate a diverse, representative and unbiased sample based on feedback from the sampling feedback module 230. Such interaction between the log data sampling module 220 and the sampling feedback module 230 can continue until the sampled logs satisfy a predetermined threshold condition for training the log parser 130 and the anomaly detector 150. The interaction will be further described below with respect to FIG. 5.

Figure 3:
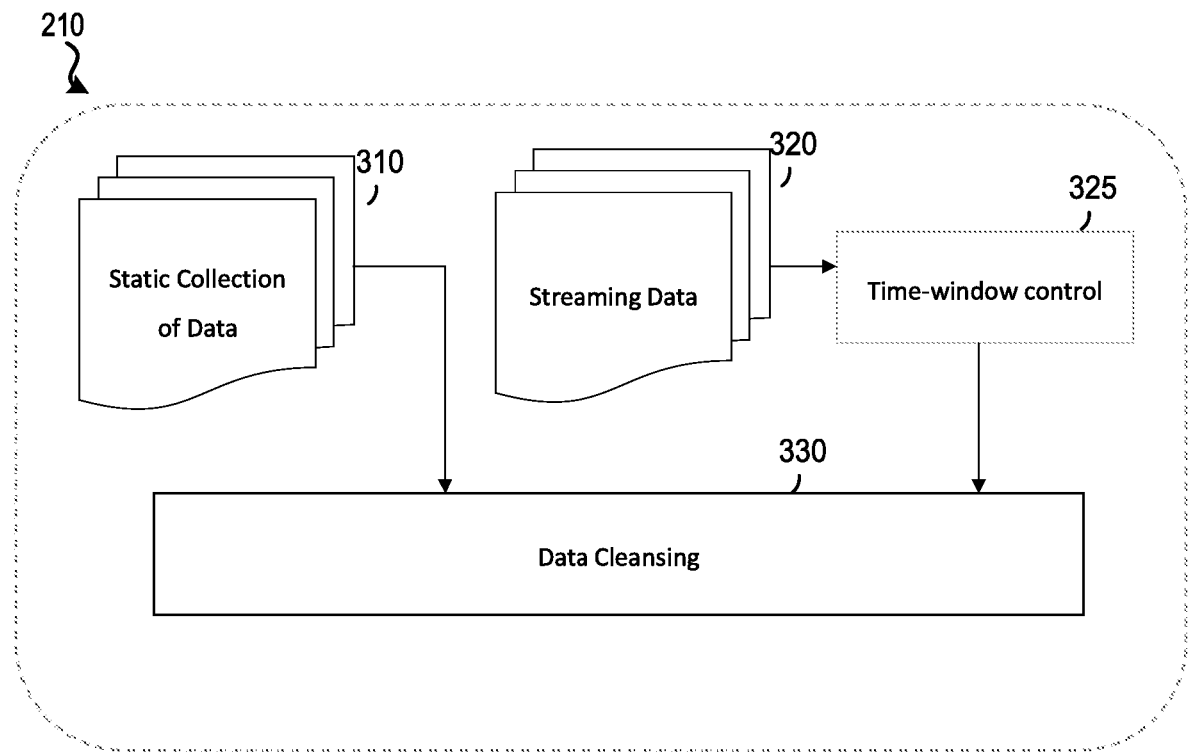
FIG. 3 is a block diagram illustration of the input data processing module in accordance with aspects of the present disclosure.

FIG. 3 is a block diagram illustration of the input data processing module 210 in accordance with aspects of the present disclosure. The input data processing module 210 receives raw logs generated by a computer system as a static collection of data 310 and/or streaming data 320. The static collection of data 310 corresponds to raw logs that have been pre-stored in a data storage. On the other hand, the streaming data 320 corresponds to raw logs that are generated in real-time (e.g., by interaction of consumers with microservices). Furthermore, the input data processing module 210 can impose a time-window control 325 on the streaming data 320 so that the input data processing module 210 receives the streaming data 320 during a specific time window (e.g., 10 seconds window). The input data processing module 210 includes a data cleansing unit 330 that converts raw logs of different formats into a single uniform format. In some implementations, the data cleansing unit 330 can filter out information from a raw log and generate a new log in a new format. In another implementation, the data cleansing unit 330 can modify the raw log into the new format by removing information that is extraneous to the new format or adding information to be included in the new format.

Figure 4:
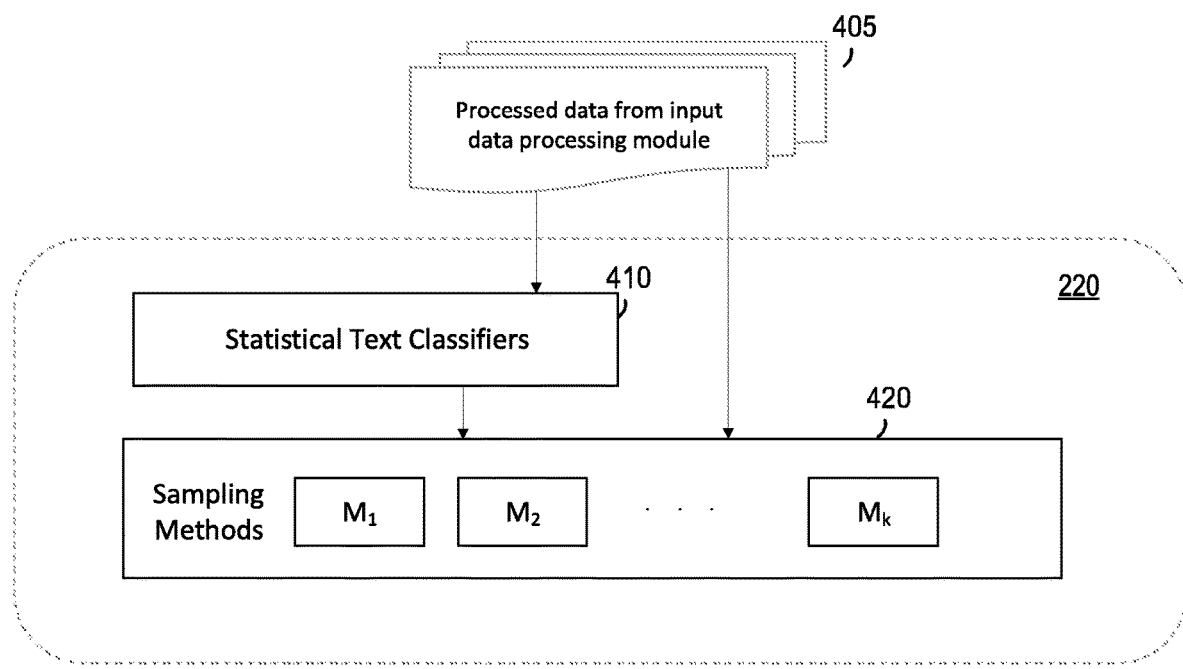
FIG. 4 is a block diagram illustration of the log data sampling module in accordance with aspects of the present disclosure.

FIG. 4 is a block diagram illustration of the log data sampling module 220 in accordance with aspects of the present disclosure. The log data sampling module 220 can receive processed data 405 from the input data processing module 210 (e.g., logs processed into the same format). In some embodiments, the log data sampling module 220 can directly receive raw logs 405 without any processing by the input data processing module 210. Once the logs 405 are received, the log data sampling module 220 can determine a sample of logs by applying a predetermined set of sample methods ($M_1$ to $M_N$) to the logs 405. Examples of the sampling methods include random sampling, stratified sampling, uncertainty sampling, vocabulary sampling, and topic-based sampling.

The log data sampling module 220 can apply the sample methods in parallel, in sequence, or a combination of the two. In a parallel approach, the log data sampling module 220 can apply each sampling method over the entire logs 405. Then, the log data sampling module 220 determines a union of the selected logs from each sampling method as a sample. On the other hand, in a sequential approach, the log data sampling module 220 can apply the sampling methods in a predetermined order. For example, the log data sampling module 220 can apply the first sampling method to the entire logs 405. However, when applying the next sampling method, the log data sampling module 220 applies the second sampling method only to the logs that are not selected by the first sampling method and so on.

When applying a sampling method to logs 405, the log data sampling module 220 can directly apply the sampling method to the logs 405, or initially apply a statistical text classifier 410 to the logs and then apply the sampling method to classified logs. The statistical text classifier 410 can be a machine learning model for classification or statistical profiling of logs 405 based on learned rules. As an example, when applying a topic-based sampling, the log data sampling module 220 can provide the logs 405 to the statistical text classifier 410 and obtain as outputs, logs that are labelled or classified by topics. Then, the log data sampling module 220 can quantify the topic distribution of the logs 405 based on the outputs of the statistical text classifier 410. Subsequently, the log data sampling module 220 can apply the topic-based sampling to the logs 405 based on the topic distribution to select logs within a predetermined range of distribution (e.g., a standard deviation) as a sample. As another example, when applying a vocabulary sampling, the log data sampling module 220 can determine frequencies of words in the logs 405 using the statistical text classifier 410. Then, the log data sampling module 220 can select logs that contains certain words for more than or less than a threshold number of times as a sample.

Figure 5:
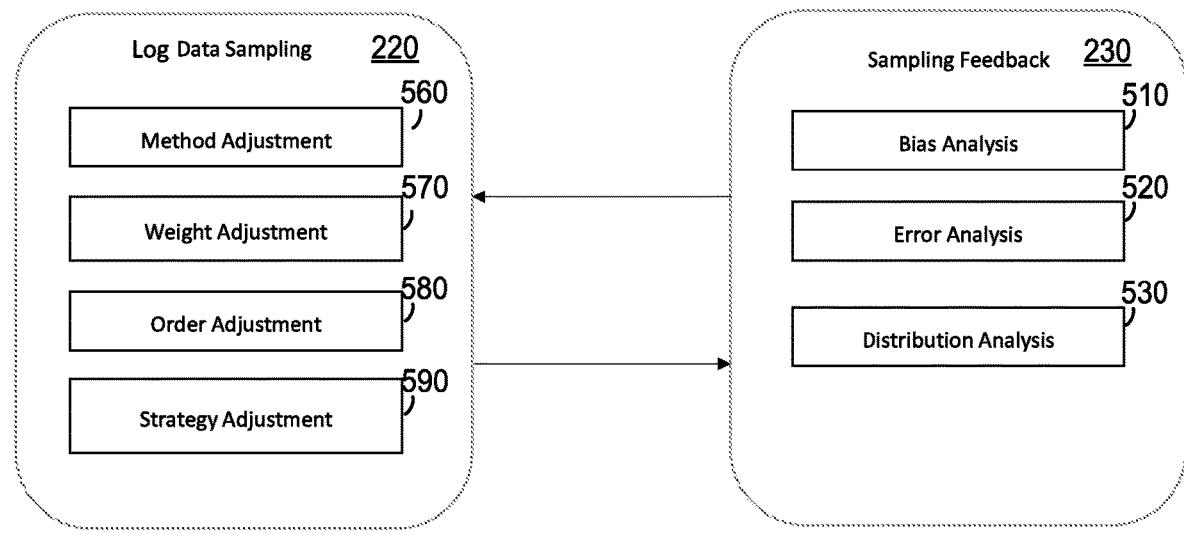
FIG. 5 is a block diagram illustration of the log data sampling module and the sampling feedback module in accordance with aspects of the present disclosure.

FIG. 5 is a block diagram illustration of the log data sampling module 220 and the sampling feedback module 230 in accordance with aspects of the present disclosure. The sampling feedback module 230 can perform multiple analyses based on the sampled logs determined by the log data sampling module 220. Accordingly, the sampling feedback module 230 can include some or all of bias analysis unit 510, error analysis unit 520, and distribution analysis unit 530. The bias analysis unit 510 can identify a bias in sampled logs. The error analysis unit 520 can determine an error associated with the anomaly detector machine learning model when sampled logs are provided as an input to the anomaly detection model. The distribution analysis unit 530 can compute statistical distribution (e.g., variance and standard deviation) of the sampled logs. Details of the analyses performed by these analysis units 510, 520, and 530 will be described in details below with respect to FIG. 6.

After the analyses, the sampling feedback module 230 can provide result of the analyses to the log data sampling module 220. In response, the log data sampling module 220 can adjust or update sampling methods. Accordingly, the log data sampling module 220 can include method adjustment unit 560, weight adjustment unit 570, order adjustment unit 580, and strategy adjustment unit 590. These adjustment units 560, 570, 580, and 590 operate based on the analysis result or feedback from the log data sampling module 220.

In particular, the method adjustment unit 560 can update how a sampling method selects a group of logs. The weight adjustment unit 570 can adjust weights associated with sampling methods. The order adjustment unit 580 can change an order of applying sampling methods in the sequential approach. The strategy adjustment unit 590 can determine whether the parallel approach, sequential approach, or a combination of both approaches should be used in the sampling. Further details about adjustments based on the sampling feedback will be described below with respect to FIG. 6.

Figure 6:
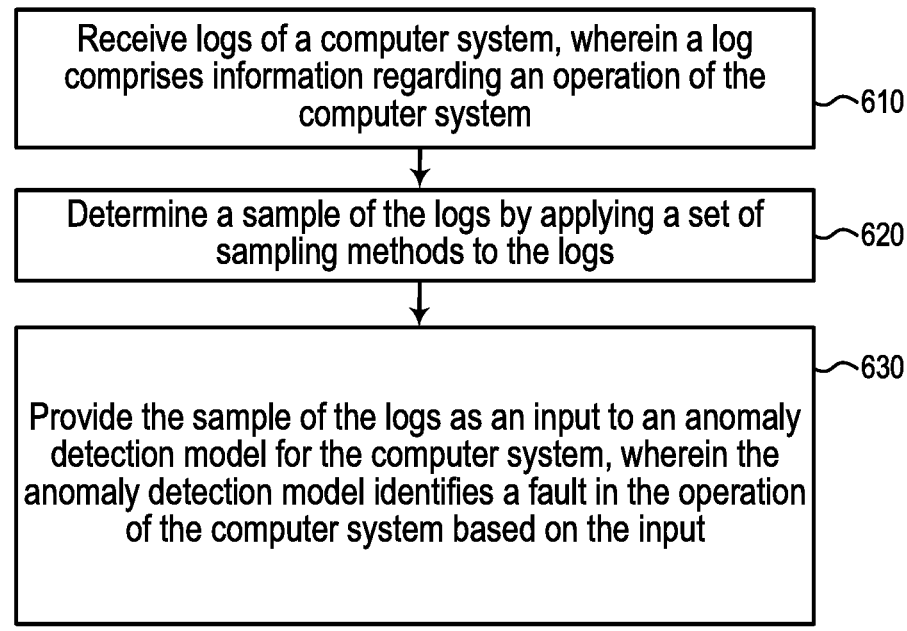
FIG. 6 is a process flow diagram illustration of a sample log data selection process in accordance with aspects of the present disclosure.

FIG. 6 is a process flow diagram illustration of a sample log data selection process 600 in accordance with aspects of the present disclosure. As described further below, the process 600 is configured to provide sample log data to an anomaly detection model. In some embodiments, the anomaly detection model refers to the anomaly detector 150 that is being trained. In other embodiments, the anomaly detection model refers to both the log parser 130 and the anomaly detector 150 that are being trained. In some instances, one or more steps of the process 600 may be performed by a processing device such as the sample log data selection unit 110 and/or one or more of the other systems, components, methods, and/or processes described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 6, at operation 610, a processing device receives logs of a computer system. The processing device can receive the logs during a predetermined period of time. A log can be a textual message in an unstructured format. The log can represent any information regarding an operation of the computer system. For example, the log can contain system runtime information such as a timestamp, an event associated with the operation, and a parameter associated with the operation. An exemplary log can include, for example, "2015-10-18 18:05?29, 570 INFO dfs.DataNodes-$PacketResponder: Received block blk_-5627252880 of size 6718934 from/10.251.91.84". The log can be generated by any of applications, operating systems, network devices, and programmable or smart devices and provided to the processing device. Moreover, the logs can be generated by microservices supported by any of the software or devices.

The processing device can receive logs from one or more sources and during a predetermined time period.

At operation 620, the processing device determines a sample of the logs by applying a set of sampling methods to the logs. Examples of sampling methods can include a random sampling, stratified sampling, uncertainty sampling, vocabulary sampling, and topic-based sampling.

The processing device can determine the set of sampling methods from available sampling methods. The processing device can select some or all of the available sampling methods to be included in the set for the application. The selection can be based on sampling feedback which will be described in details below. Initially, the processing device can include all available sampling methods to the set.

In some implementations, the processing device can undertake a parallel approach to determine a sample of the logs. In the parallel approach, the processing device can determine, for each sampling method of the set, a respective sub-sample of the logs by applying a respective sampling method to the logs. A total size of the sub-samples can amount to a preset target sample size. For example, the set of sampling methods can include a random sampling and topic-based sampling and the target size can be 100,000. In such a case, the processing device can apply a random sampling to the logs and obtain 50,000 randomly selected logs (i.e., a sub-sample) and also, apply the topic-based sampling to the logs and identify another 50,000 logs (i.e., a sub-sample). Furthermore, as in the example, the processing device can apply a sampling method to the logs in accordance with an associated weight or proportion (e.g., 0.5 or 50% each). The processing device can assign a weight or a proportion to each sampling method of the set. The weight of a sampling method can correspond to a size of the respective sub-sample to be determined by the respective sampling method. The total size of sub-samples should equal a target size of a sample. In another example, the processing device can apply a sampling method to not all logs received at operation 610. The processing device can apply the sampling methods in any order. After applying all sample methods of the set to the logs, the processing device can determine a union of sub-samples as the sample of the logs.

In some other implementations, the processing device can adopt a sequential approach in determining the sample of the logs. In the sequential approach, the processing device can determine a sample by applying sampling methods to the logs in a preset order. In addition, as will be described below, the order of sampling can be updated based on the sampling feedback. As an example, the processing device can determine that the set of sampling methods includes a stratified sampling and a topic-based sampling and that a preset order of sampling is the stratified sampling first and then the topic-based sampling. The processing device can determine a sub-sample by applying the stratified sampling to the logs received at operation 610. Based on the sub-sample of the stratified sampling, the processing device can determine the rest of the logs (i.e., logs that are not included in the sub-sample). Then, the processing device can determine another sub-sample by subsequently applying the topic-based sampling to the rest of the logs other than the sub-sample of the stratified sampling. The processing device can determine the sub-sample of the stratified sampling and the sub-sample of the topic-based sampling as the sample of the logs. In an implementation, as described above in the parallel approach, the processing device can determine weights associated with the sampling methods and ensure that sizes of the sub-samples reflect the weights in view of the target sample size.

The processing device can determine whether to use the parallel approach or the sequential approach based on a preconfigured setting. As will be later described below, the processing device can also, determine which approach to take based on the sampling feedback. In some implementations the processing device can utilize a combination of the parallel and sequential approaches.

As such, the processing device can update how the set of sampling methods are applied based on the sampling feedback when a threshold condition is satisfied. Examples of the threshold condition include a predetermined period of time and a predetermined error rate of the anomaly detection model. In response to determining that the threshold condition is met, the processing device can perform one or more analyses and adjust the set of sampling methods based on the result of the analysis. The sampling feedback process is a quality assessment over the sample to ensure that the samples are diverse, representative, and unbiased for log parsing and anomaly detection process. Accordingly, the processing device can provide multi-faceted feedback based on one or more analyses described in details below. The processing device can prospectively incorporate results of the analysis in the sample determination for improvement. The processing device can perform the sampling feedback while determining the sample of the logs, or after the sample of the logs has been determined.

In some implementations, as a part of the sampling feedback process, the processing device analyzes the sample of the logs by using at least one of a bias in the sample, an error in the identified fault of the anomaly detection model based on the sample, or a statistical distribution of the sample.

In one implementation, the processing device can analyze bias in the sampled logs based on a predetermined set of keywords (i.e., seed words for the bias analysis). The processing device can perform the analysis in some or all of the sampled logs. The keywords can be associated with any one or combination of a particular operation (or service) of the computer system, a particular device of the computer system, and a particular anomaly in the computer system. The processing device can identify bias words in text of the sampled logs using the predetermined set of keywords. The processing device can determine any words from the text that are placed near the vicinity of, or that are similar (e.g., as can be measured by cosine similarity) to the predetermined set of keywords as bias words. If the number of bias words exceeds a threshold value, the processing device can determine that the bias exists in the sampled logs. After detecting the bias in the text of the sampled logs, the processing device can determine that an adjustment is needed to a sampling method in the set.

In another implementation, the processing device can analyze an error in the identified fault of the anomaly detection model based on the sample. To determine an error associated with the anomaly detection model, the processing device can determine whether a confidence level of the anomaly detection model exceeds a predetermined threshold. Furthermore, the processing device can incorporate ticket data in the error analysis. Ticket data is an alert notifying a system administrator of an incident that impacts service (e.g., microservice) provided by the computer system to customers. The processing device can incorporate an error rate in catching the incidence of the ticket data to an overall error rate of the anomaly detection model. For example, the processing device can determine the error rate associated with the ticket data by comparing the ticket data with an output (i.e., identified faults) of the anomaly detection model and determining whether a fault associated with the error of the ticket data was identified based on the sampled logs. In response to determining that the error rate exceeds a threshold, the processing device can proceed to adjust the sampling methods.

Yet in another implementation, the processing device can analyze a statistical distribution of the sample. For example, the processing device can determine log templates associated with the sampled logs. A log template is a template used in parsing a log in a structured format. Accordingly, the processing device can identify an associated log template when a log in the sample can be parsed using the log template. After determining the log templates, the processing device can compute a statistical distribution (e.g., a variance and a standard deviation) of the sampled logs based on the log templates. The processing device can determine whether or not the variance and/or the standard deviation is within a threshold range. In case the statistical distribution of the sampled logs is not within the threshold range, the processing device can adjust the sampling methods accordingly, as will be described in details below.

Once the sampled logs are analyzed, the processing device can update the set of sampling methods based on one or more of the analyses as described above. The processing device can update the set of sampling methods by adjusting a sampling method, a weight associated with a sampling method, an order of applying the set of sampling methods, or sampling strategy regarding the parallel and sequential approaches.

In some implementations, the processing device can adjust sampling methods by adding or removing a sampling method from the set of sampling methods. In one implementation, the processing device can add or remove a sampling method based on predetermined ranks of the sampling methods. The processing device can rank each sampling method based on an error rate of the anomaly detection model determined when only the respective sampling method was used in selecting a sample for a predetermined period of time. A sampling method associated with the least error rate of the anomaly detection model can be ranked highest and vice versa. For example, in a case of the error analysis, if the error rate is above a threshold, the processing device can remove a sampling method having the lowest rank from the set. In another implementation, the processing device can add or remove a sampling method regardless of the ranking. As an example, in a case of the distribution analysis, if a standard deviation is less than a threshold value, the processing device can add a sampling method (regardless of a rank) to the set.

Additionally, the processing device can update a sampling method by adjusting how a sub-sample is selected in accordance with the sampling method. For example, in a case of the bias analysis, the processing device can determine a sampling method that is associated with any bias words or keywords of the bias analysis. As an example, the processing device can determine that a vocabulary-based sampling involves a bias word or a keyword in selecting a sample. Consequently, the processing device can remove the bias word or the keyword from a list of vocabulary used in the vocabulary-based sampling. The similar adjustment can be made to the topic-based sampling. If the bias word or the keyword is associated with a topic used in selecting a sub-sample, the processing device can remove the topic from a list of topics used in the sampling.

In some other implementations, the processing device can update the set of sampling methods based on the analysis by adjusting a weight associated with a sampling method in the set. As described above, weights or proportions can be assigned to the sampling methods. The processing device can increase or decrease the weight by a predetermined amount to suppress any bias in the sampled logs, error in the anomaly detection model, or skewed distribution of the sampled logs.

When the sequential approach is adopted for operation 620, the processing device can update the set of sampling methods by changing an order of applying a sampling method in the set to the logs. In one implementation, the processing device can determine error rates of the anomaly detection model for different permutations of sampling orders. For each time the set of sampling methods is updated, the processing device can change the sampling order from a sampling order with the lowest error rate to the one with highest error rate. For example, in case a bias is detected based on the bias analysis, the processing device can configure the order of sampling methods to be the one with the lowest error rate. If the current sampling order is the one with the lowest error rate, then the processing device can select a sampling order with the next lowest error rate.

Moreover, the processing device can adjust sampling methods based on the sampling feedback by adjusting a sampling strategy. The sampling strategy can include the parallel approach, the sequential approach, and a combination of the parallel and sequential approaches. In the combination approach, the processing device can divide the logs from operation 610 into two groups. The processing device can apply the parallel approach to one group and the sequential approach to the other. In another implementation, the processing device can configure the set of sampling methods so that the sample has two sample groups, one group selected from applying the parallel approach and the other sample group from the sequential approach. The processing device can rank the different strategies and use an appropriate sampling strategy based on the analysis performed in the sampling feedback process.

In some implementations, the processing device can rank each strategy based on error rates of the anomaly detection model. The processing device can determine an error rate of the anomaly detection model when a sampling strategy was used for a predetermined period of time. For each time the sampling strategy is adjusted, the processing device can change the sampling strategy from a strategy with the lowest error rate to the one with highest error rate. For example, in case an error rate that exceeds a threshold rate is detected based on the error analysis, the processing device can change the sampling strategy to be the one with the lowest error rate, if the current sampling strategy is the one with the next lowest error rate.

Accordingly, at operation 620, the processing device can adjust the set of sampling methods based on the sampling feedback, thereby enhancing diversity, representativeness, and unbiasedness in the sampled logs.

At operation 630, the processing device provides the sample of the logs as an input to the anomaly detection model for the computer system. The anomaly detection model can be under training to identify a fault in the operation of the computer system based on the sample of the logs. The anomaly detection model can include two models—log parser and anomaly detector. The log parser can corresponds to a machine learning model that is being trained on the sample of logs to generate templates for parsing the logs and parsing logs using the templates. The anomaly detector can correspond to another machine learning model that is being trained on parsed logs to detect anomal behaviors or patterns in the operation of the computer system.

Figure 7:
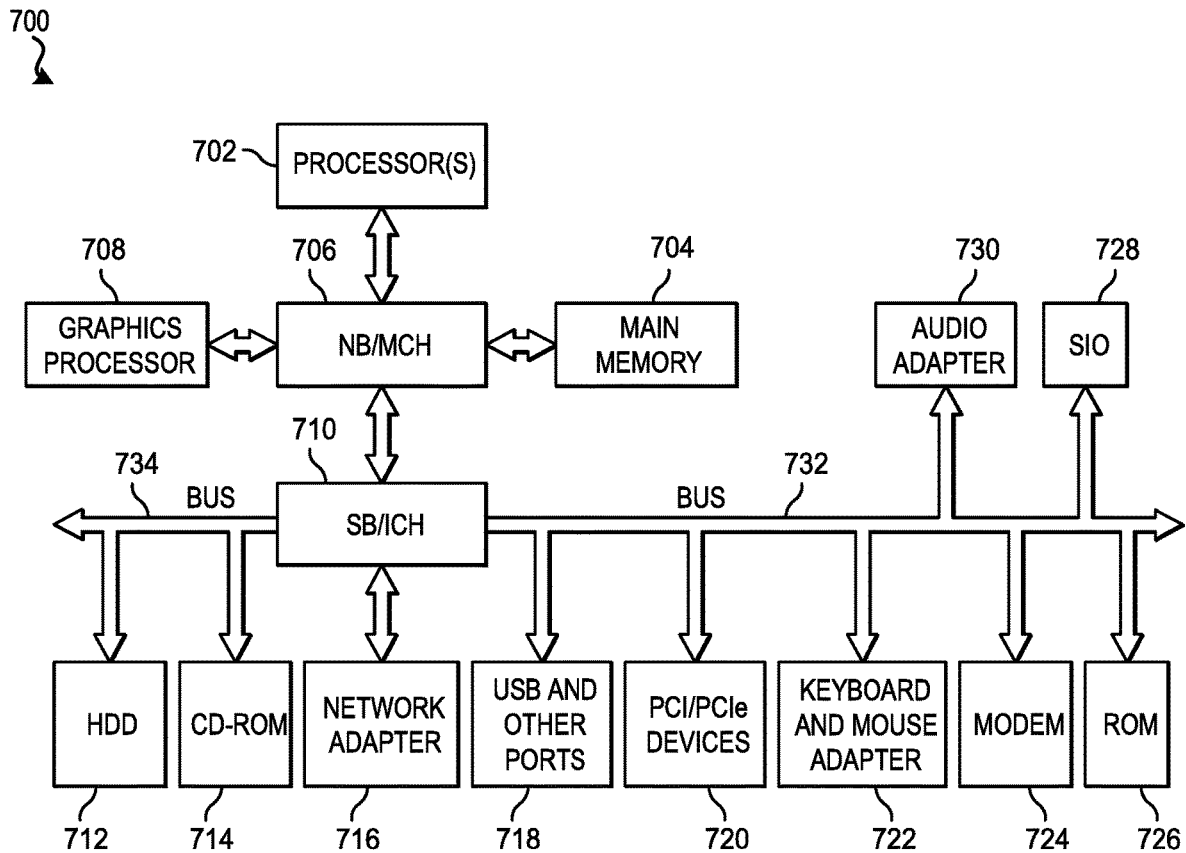
FIG. 7 is a block diagram illustration of a hardware architecture of a data processing system in accordance with aspects of the present disclosure.

FIG. 7 is a block diagram illustration of a hardware architecture of a data processing system 700 in accordance with aspects of the present disclosure. In some embodiments, one or more of the systems and/or components described herein (e.g., the sample log data selection module 110, the input data processing module 210, the log data sampling module 220, the sampling feedback module 230, etc.) may be implemented using a corresponding one or more of the data processing system 700. Moreover, the data processing system 700 may be configured to store and execute one or more instructions of the process 600 and/or any other methods and/or processes described herein.

The data processing system 700 employs a hub architecture including north bridge and memory controller hub ("NB/MCH") 706 and south bridge and input/output ("I/O") controller hub ("SB/ICH") 710. Processor(s) 702, main memory 704, and graphics processor 708 are connected to NB/MCH 706. Graphics processor 708 may be connected to NB/MCH 706 through an accelerated graphics port ("AGP"). A computer bus, such as bus 732 or bus 734, may be implemented using any type of communication fabric or architecture that provides for a transfer of data between different components or devices attached to the fabric or architecture.

Network adapter 716 connects to SB/ICH 710. Audio adapter 730, keyboard and mouse adapter 722, modem 724, read-only memory ("ROM") 726, hard disk drive ("HDD") 712, compact disk read-only memory ("CD-ROM") drive 714, universal serial bus ("USB") ports and other communication ports 718, and peripheral component interconnect/peripheral component interconnect express ("PCI/PCIe") devices 720 connect to SB/ICH 710 through bus 732 and bus 734. PCI/PCIe devices may include, for example, Ethernet adapters, add-in cards, and personal computing ("PC") cards for notebook computers. PCI uses a card bus controller, while PCIe does not. ROM 726 may comprise, for example, a flash basic input/output system ("BIOS"). Modem 724 or network adapter 716 may be used to transmit and receive data over a network.

HDD 712 and CD-ROM drive 714 connect to SB/ICH 710 through bus 734. HDD 712 and CD-ROM drive 714 may use, for example, an integrated drive electronics ("IDE") or serial advanced technology attachment ("SATA") interface. In some embodiments, the HDD 712 may be replaced by other forms of data storage devices including, but not limited to, solid-state drives ("SSDs"). A super I/O ("SIO") device 728 may be connected to SB/ICH 710. SIO device 728 may comprise a chip on the motherboard that is configured to assist in performing less demanding controller functions for the SB/ICH 710 such as controlling a printer port, controlling a fan, and/or controlling the small light emitting diodes ("LEDS") of the data processing system 700.

The data processing system 700 may include a single processor 702 or may include a plurality of processors 702. Additionally, processor(s) 702 may have multiple cores. In some embodiments, data processing system 700 may employ a large number of processors 702 that include hundreds or thousands of processor cores. In some embodiments, the processors 702 may be configured to perform a set of coordinated computations in parallel.

An operating system is executed on the data processing system 700 using the processor(s) 702. The operating system coordinates and provides control of various components within the data processing system 700. Various applications and services may run in conjunction with the operating system. Instructions for the operating system, applications, and other data are located on storage devices, such as one or more of the HDD 712, and may be loaded into main memory 704 for execution by processor(s) 702. In some embodiments, additional instructions or data may be stored on one or more external devices. The processes described herein for the illustrative embodiments may be performed by processor(s) 702 using computer usable program code, which may be located in a memory such as, for example, main memory 704, ROM 726, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including a scripting language, such as Python or the like, an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving logs of a computer system, wherein a log comprises information regarding an operation of the computer system;
   determining a sample of the logs by applying a set of sampling methods to the logs to:
      determine that the set of sampling methods includes a first sampling method and a second sampling method;
      determine a first sub-sample by applying the first sampling method to the logs;
      determine a second sub-sample by applying the second sampling method to the rest of the logs other than the first sub-sample; and
      determine the first sub-sample and the second sub-sample as the sample of the logs; and
   providing the sample of the logs as an input to an anomaly detection model for the computer system, wherein the anomaly detection model identifies a fault in the operation of the computer system based on the input.

2. The method of claim 1, wherein determining the sample of the logs comprises:
   determining, for each sampling method of the set, a respective sub-sample of the logs by applying a respective sampling method to the logs; and
   determining a union of sub-samples as the sample of the logs.

3. The method of claim 1, wherein determining the sample of the logs comprises:
   analyzing the sample of the logs by using at least one of a bias in the sample, an error in the identified fault of the anomaly detection model based on the sample, or a statistical distribution of the sample; and
   updating the set of sampling methods based on the analysis of the sample.

4. The method of claim 3, wherein updating the set of sampling methods comprises at least one of adding or removing a sampling method from the set of sampling methods, or adjusting a weight associated with a sampling method in the set.

5. The method of claim 4, wherein updating the set of sampling methods further comprises changing an order of applying a sampling method in the set to the logs.

6. The method of claim 1, wherein the set of sampling methods includes at least two of a random sampling, stratified sampling, uncertainty sampling, vocabulary sampling, or topic-based sampling.

7. A system comprising:
a memory having instructions; and
at least one processor in communication with the memory, wherein the at least one processor is configured to:
receive logs of a computer system, wherein a log comprises information regarding an operation of the computer system, and wherein the computer system supports microservices;
determine a sample of the logs by applying a set of sampling methods to the logs to:
determine that the set of sampling methods includes a first sampling method and a second sampling method;
determine a first sub-sample by applying the first sampling method to the logs;
determine a second sub-sample by applying the second sampling method to the rest of the logs other than the first sub-sample; and
determine the first sub-sample and the second sub-sample as the sample of the logs; and
provide the sample of the logs as an input to an anomaly detection model for the computer system, wherein the anomaly detection model identifies a fault in the operation of the computer system based on the input.

8. The system of claim 7, wherein to determine the sample of the logs, the at least one processor is configured to:
determine, for each sampling method of the set, a respective sub-sample of the logs by applying a respective sampling method to the logs; and
determine a union of sub-samples as the sample of the logs.

9. The system of claim 7, wherein to determine the sample of the logs, the at least one processor is configured to:
analyze the sample of the logs by using at least one of a bias in the sample, an error in the identified fault of the anomaly detection model based on the sample, or a statistical distribution of the sample; and
update the set of sampling methods based on the analysis of the sample.

10. The system of claim 9, wherein to update the set of sampling methods, the at least one processor is configured to perform at least one of adding or removing a sampling method from the set of sampling methods, or adjusting a weight associated with a sampling method in the set.

11. The system of claim 10, wherein to update the set of sampling methods, the at least one processor is further configured to change an order of applying a sampling method in the set to the logs.

12. The system of claim 7, wherein the set of sampling methods includes at least two of a random sampling, stratified sampling, uncertainty sampling, vocabulary sampling, or topic-based sampling.

13. A computer program product comprising:
a computer readable storage medium having program instructions that are executable by at least one processor to cause the at least one processor to:
receive logs of a computer system, wherein a log comprises information regarding an operation of the computer system;
determine a sample of the logs by applying a set of sampling methods to the logs to:
determine that the set of sampling methods includes a first sampling method and a second sampling method;
determine a first sub-sample by applying the first sampling method to the logs;
determine a second sub-sample by applying the second sampling method to the rest of the logs other than the first sub-sample; and
the first sub-sample and the second sub-sample as the sample of the logs; and
provide the sample of the logs as an input to an anomaly detection model for the computer system, wherein the anomaly detection model identifies a fault in the operation of the computer system based on the input.

14. The computer program product of claim 13, wherein to determine the sample of the logs, the program instructions cause the at least one processor to:
determine, for each sampling method of the set, a respective sub-sample of the logs by applying a respective sampling method to the logs; and
determine a union of sub-samples as the sample of the logs.

15. The computer program product of claim 13, wherein to determine the sample of the logs, the program instructions cause the at least one processor to:
analyze the sample of the logs by using at least one of a bias in the sample, an error in the identified fault of the anomaly detection model based on the sample, or a statistical distribution of the sample; and
update the set of sampling methods based on the analysis of the sample.

16. The computer program product of claim 15, wherein to update the set of sampling methods, the program instructions cause the at least one processor to perform at least one of adding or removing a sampling method from the set of sampling methods, or adjusting a weight associated with a sampling method in the set.

17. The computer program product of claim 16, wherein to update the set of sampling methods, the program instructions cause the at least one processor to change an order of applying a sampling method in the set to the logs.

* * * * *